United States Patent
Hsia et al.

(10) Patent No.: US 11,320,880 B2
(45) Date of Patent: May 3, 2022

(54) MULTIFUNCTION DISPLAY PORT

(71) Applicant: Hewlett-Packard Development Company, L.P., Spring, TX (US)

(72) Inventors: Yi-Fan Hsia, Taipei (TW); Daniel Chung, Taipei (TW); Hung Lung Chen, Taipei (TW); Chai-Cheng Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/252,366

(22) PCT Filed: Nov. 1, 2018

(86) PCT No.: PCT/US2018/058757
§ 371 (c)(1),
(2) Date: Dec. 15, 2020

(87) PCT Pub. No.: WO2020/091795
PCT Pub. Date: May 7, 2020

(65) Prior Publication Data
US 2021/0271302 A1 Sep. 2, 2021

(51) Int. Cl.
*G06F 1/26* (2006.01)
*G06F 3/041* (2006.01)
(Continued)

(52) U.S. Cl.
CPC ............. *G06F 1/266* (2013.01); *G06F 3/0416* (2013.01); *G06F 3/14* (2013.01); *G06F 13/4081* (2013.01)

(58) Field of Classification Search
CPC ............. G09G 2330/021; G09G 5/006; G09G 2310/08; G09G 5/12; G09G 2320/0626; G09G 5/001; G09G 2330/027; G09G 2360/06; G09G 2330/02; Y02D 10/00; G06F 1/3265; G06F 1/1601; G06F 1/3218; G06F 1/266; G06F 13/385; G06F 1/3203; G06F 2200/1612; G06F 3/0416; G06F 3/14; G06F 13/4081; G06F 13/42
(Continued)

(56) References Cited

U.S. PATENT DOCUMENTS 5,675,364 A * 10/1997 Stedman ............... G06F 1/3265
345/212
6,299,464 B1 * 10/2001 Chen ..................... G06F 1/1632
439/131
(Continued)

OTHER PUBLICATIONS

Control at your Fingertips, Nov. 25, 2020, http://www.remotemouse.net, 8 pages.

*Primary Examiner* — Faisal M Zaman
(74) *Attorney, Agent, or Firm* — Mannava & Kang P.C.

(57) ABSTRACT

According to examples, an apparatus may include a processor, a display system and a multifunction display port. The multifunction display port may include a display port connector and an input power connector. In addition, based on the apparatus being in a power off state and being connected to a host device, the display system may receive input electrical energy through the input power connector from a host device, receive display data through the display port connector from the host device, and display the display data received from the host device while bypassing the processor.

15 Claims, 5 Drawing Sheets

(51) Int. Cl.
*G06F 3/14* (2006.01)
*G06F 13/40* (2006.01)

(58) Field of Classification Search
USPC .................. 345/211, 156; 713/300, 323
See application file for complete search history.

(56) References Cited

U.S. PATENT DOCUMENTS

| | | | |
|---|---|---|---|
| 6,523,127 B1* | 2/2003 | Takasu | G06F 1/3265 |
| | | | 713/324 |
| 9,092,221 B2 | 7/2015 | Lin et al. | |
| 9,772,965 B2* | 9/2017 | Parten | G06F 13/4252 |
| 2003/0001840 A1* | 1/2003 | Spitzer | G06T 15/005 |
| | | | 345/420 |
| 2003/0159077 A1* | 8/2003 | Matsuo | G06F 1/3203 |
| | | | 713/300 |
| 2003/0163666 A1* | 8/2003 | Cupps | G06F 1/3293 |
| | | | 712/1 |
| 2005/0078128 A1* | 4/2005 | Ozeki | G09G 5/10 |
| | | | 345/690 |
| 2005/0248522 A1* | 11/2005 | Koselj | G06T 11/203 |
| | | | 345/98 |
| 2006/0036885 A1* | 2/2006 | Hsieh | G06F 1/266 |
| | | | 713/300 |
| 2006/0139344 A1* | 6/2006 | Tseng | G06F 1/3265 |
| | | | 345/211 |
| 2007/0129101 A1* | 6/2007 | Wang | H04M 1/2473 |
| | | | 455/550.1 |
| 2008/0303946 A1* | 12/2008 | Cox | H04N 5/44 |
| | | | 348/552 |
| 2009/0102744 A1* | 4/2009 | Ram | G06F 1/1696 |
| | | | 345/1.1 |
| 2010/0295870 A1 | 11/2010 | Baghadadi et al. | |
| 2010/0323763 A1* | 12/2010 | Englebrecht | H04N 21/4436 |
| | | | 455/566 |
| 2012/0172088 A1 | 7/2012 | Kirch et al. | |
| 2012/0226846 A1 | 9/2012 | Chung | |
| 2013/0009864 A1 | 1/2013 | Jeong | |
| 2013/0050122 A1 | 2/2013 | Kang et al. | |
| 2013/0069865 A1* | 3/2013 | Hart | H04B 7/00 |
| | | | 345/156 |
| 2013/0092805 A1* | 4/2013 | Funk | F16M 13/00 |
| | | | 248/274.1 |
| 2013/0125191 A1 | 5/2013 | Chen et al. | |
| 2014/0139431 A1 | 5/2014 | Tseng et al. | |
| 2016/0253282 A1 | 9/2016 | Bowers et al. | |
| 2017/0017283 A1* | 1/2017 | Seo | G06F 1/266 |
| 2017/0344507 A1* | 11/2017 | Chen | G06F 13/4081 |
| 2018/0204506 A1* | 7/2018 | Chen | G06F 13/4282 |

\* cited by examiner

MULTIFUNCTION DISPLAY PORT

BACKGROUND

Electronic devices, such as tablet computers, smartphones, and laptop computers may operate as a host device to a peripheral display. For instance, such electronic device may output display data a peripheral display such that the peripheral display may operate as an extended or mirrored display of the electronic device. In some instances, the peripheral display may be larger than the display on the electronic device.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
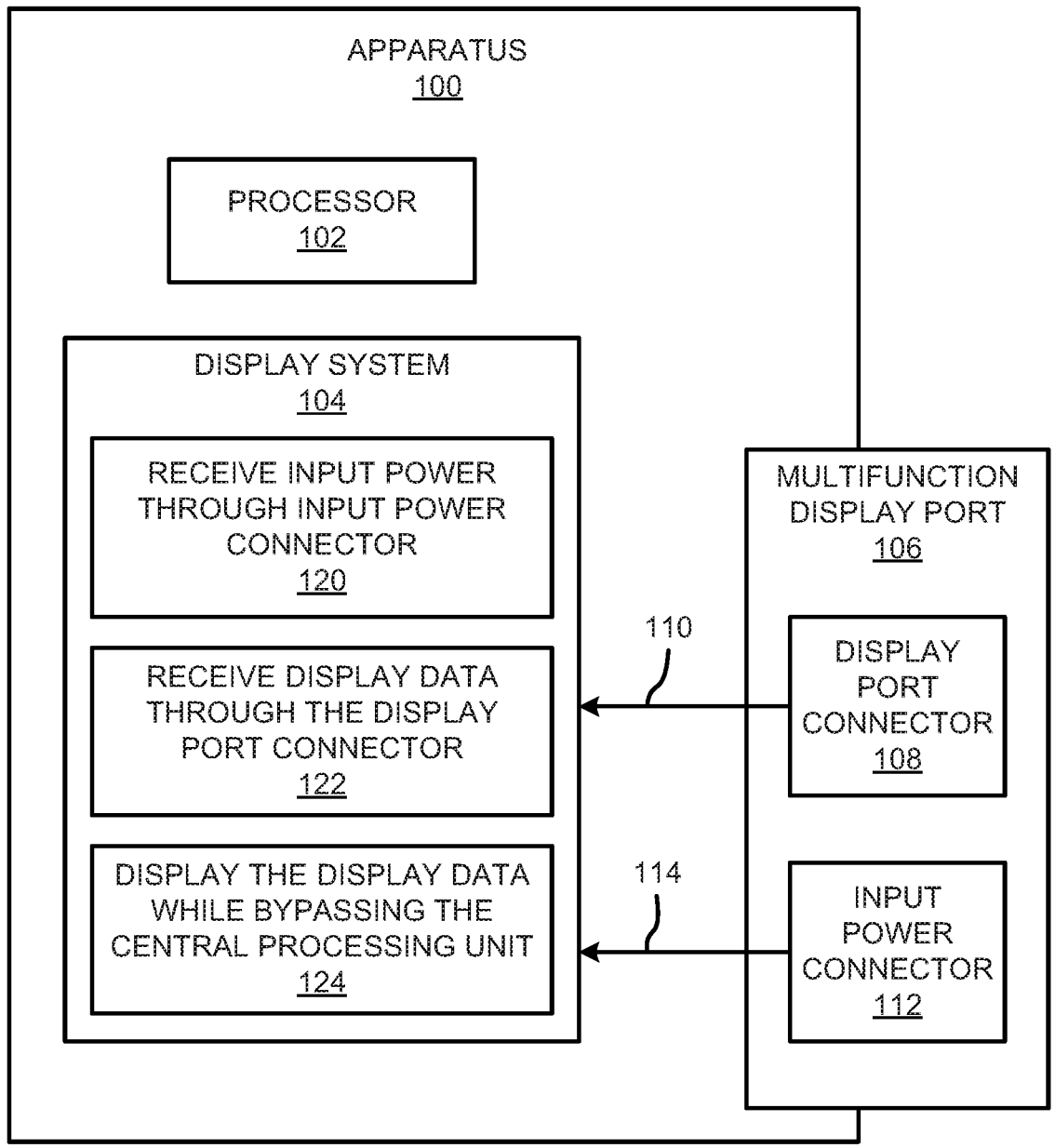
FIG. 1 shows a block diagram of an example apparatus that may operate as a peripheral display of a host device when the example apparatus is in a power off state.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote one of a particular element or multiple ones of the particular element. As used herein, the term "includes" means includes but not limited to, the term "including" means including but not limited to. The term "based on" may mean based in part on.

Disclosed herein are apparatuses that may operate as a peripheral display device for a host device while the apparatuses are in a power off state. That is, the apparatuses may include a display system that may display input display data received from the host device while the apparatuses are powered off, e.g., while the display system is not receiving electrical energy from an internal power supply of the apparatus within which the display system is located. Instead, the display system may receive electrical energy from the host device, even though the apparatus may include an internal power supply. In addition, the display system may display the input display data received from the host device while bypassing a processor, e.g., CPU, of the apparatus. For instance, the display system may display the input display data without intervention of the display by the processor.

The apparatuses disclosed herein may operate as intended while the apparatuses are in a power on state. That is, for instance, the display system may receive electrical energy from the internal power supply and may receive display data from the processor of the apparatuses. In addition, while in the power on state, the apparatuses disclosed herein may output display data to an external device such that the external device may operate as an external display device, a mirrored display device, an input device, etc., for the apparatus. The apparatus may also, in some examples, output electrical energy to the external device.

The apparatuses disclosed herein may include a multifunction display port that may include a plurality of connectors through which various data and electrical energy may be communicated between the apparatus and the host device, Various data and electrical energy may also be communicated between the apparatus and the external device through the plurality of connectors. The plurality of connectors may be connected to various components in the apparatus. The components may include various multiplexers that may direct data and/or electrical energy to other components in the apparatus based on, for instance, whether the apparatus is in a power on state or a power off sate, the source of the data and/or the electrical energy.

Through implementation of the apparatuses disclosed herein, the apparatuses may have additional functionality as a second display device and/or input device of a host device while the apparatus is in a power off state. In addition, the apparatuses may operate normally, e.g., as a computing device such as a tablet computing device or the like, while in a power on state.

Figure 2:
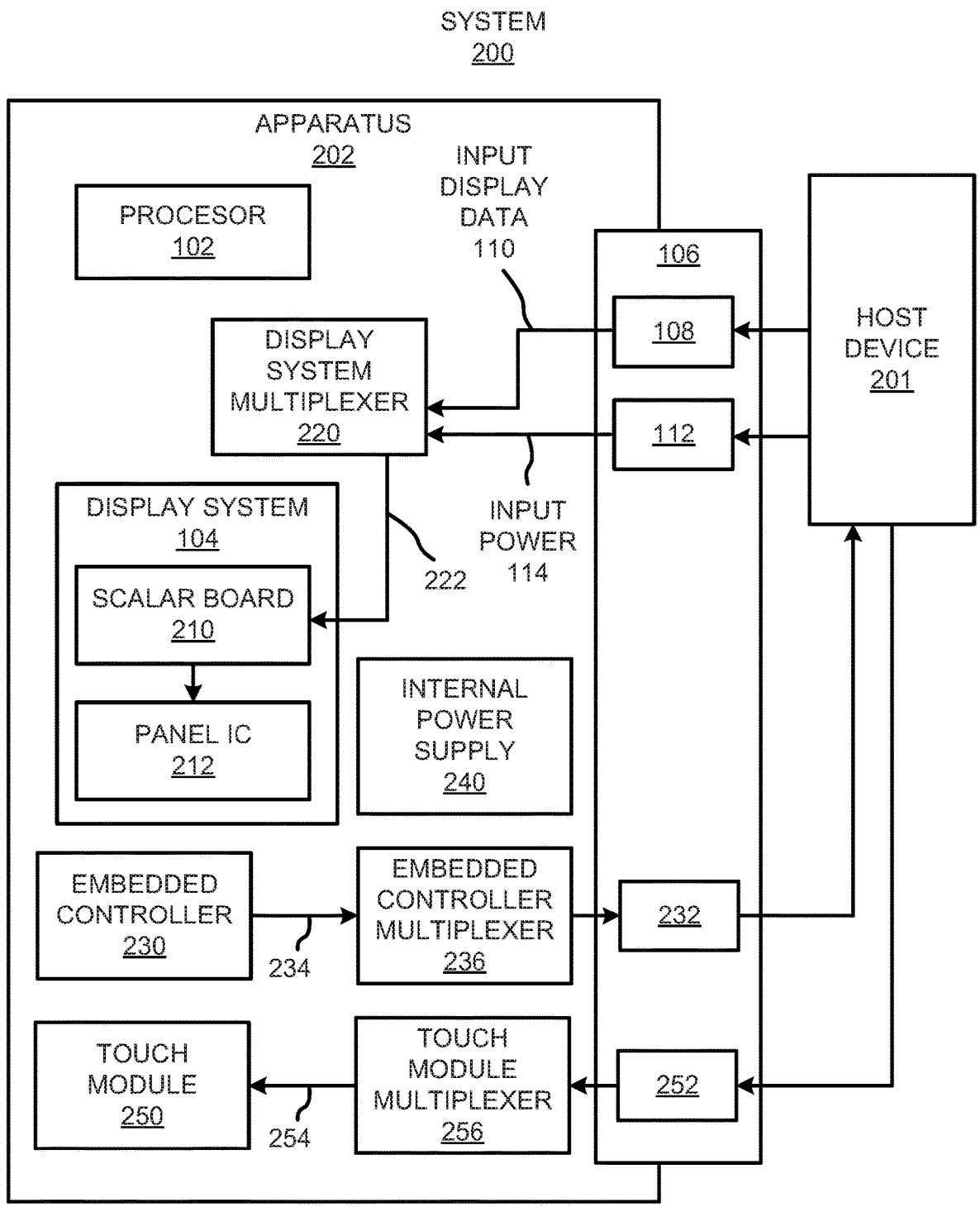
FIG. 2 shows a block diagram of an example system that may include a host device and an example apparatus, in which the example apparatus may be in a power off state.

Reference is first made to FIGS. 1 and 2, FIG. 1 shows a block diagram of an example apparatus 100 that may operate as a peripheral display for a host device when the example apparatus 100 is in a power off state. FIG. 2 shows a block diagram of an example system 200 that may include a host device 201 and an example apparatus 202, in which the example apparatus 202 may be in a power off state. It should be understood that the example apparatus 100 and/or the example system 200 depicted in FIGS. 1 and 2 may include additional components and that some of the components described herein may be removed and/or modified without departing from the scopes of the example apparatus 100 and/or the example system 200 disclosed herein. The apparatus 202 depicted in FIG. 2 may be similar to the apparatus 100 and thus, the following descriptions of the apparatus 100 may be construed as also corresponding to the apparatus 202.

In some examples, the apparatus 100 may be a computing device, such as a tablet computer, a smartphone, a laptop computer, or the like. In other examples, the apparatus 100 may include components of a computing device, such as a circuit board and an external port. The host device 201 may also be a computing device, such as a tablet computer, a smartphone, a laptop computer, or the like. The apparatus 100 may be in one of a power on state, which may equivalently be termed a power on mode, an active state, or the like, and a power off state, which may equivalently be termed a power off mode, an inactive state, or the like. The power on state may be a state in which the apparatus 100 may function as intended, e.g., a state in which a user may control displayed contents on the apparatus 100 via interaction with the apparatus 100, The power on state may include a fully powered on state as well as a standby state in which some of the components of the apparatus 100 may be powered on, for instance, to detect a user interaction with the apparatus 100 that may cause the apparatus 100 to move from the standby state to the fully powered on state.

In contrast, the power off state may include a fully powered off state in which a user may depress a power on/off button to cause the apparatus 100 to emerge from the power off state. That is, for instance, user interactions other than the depression of the power on/off button may not cause the apparatus 100 to emerge from the power off state. In addition, when in the power off state, components of the apparatus 100, except for an embedded controller, may not receive electrical energy from an internal power source, such as a battery.

The apparatus 100 may include a processor 102, which may control operations of the apparatus 100 when the apparatus 100 is in a power on state However, when the apparatus 100 is in a power off state, the processor 102 may not control operations of the apparatus 100, as discussed herein. In some examples, the processor 102 may be an integrated circuit, such as an application-specific integrated circuit (ASIC), or other hardware circuit. In these examples, instructions that the processor 102 may execute may be programmed into the integrated circuit. In other examples, the processor 102 may operate with firmware (i.e., machine-readable instructions) stored in a memory. In these examples, the processor 102 may be a microprocessor, a central processing unit (CPU), a graphics processing unit (GPU), or the like, and the instructions may be firmware and/or software that the processor 102 may execute, as discussed in detail herein.

The apparatus 100 may also include a multifunction display port 106 to which the host device 201 (FIG. 2) may be connected. That is, for instance, the host device 201 may include a compatible port that may be mated with the multifunction display port 106. For instance, the multifunction display port 106 may include a male connector (e.g., pin) and the compatible port of the host device 201 may include a female connector (e.g., slot) into which the male connector of the multifunction display port 106 may be mated. In other examples, the multifunction display port 106 may include a female connector (e.g., slot) and the compatible port of the host device 201 may include a male connector (e.g., pin) that may be mated with the female connector of the multifunction display port 106.

The connectors of the multifunction display port 106 may be connected to various components in the apparatus 100 as discussed in greater detail herein such that data and/or electrical energy may be communicated into the apparatus 100 through the connectors. One of the connectors may be a display port connector 108 through which input display data 110 may be received into the apparatus 100 from the host device 201. Another one of the connectors may include an input power connector 112 through which some of the components, including the display system 104, of the apparatus 100 may receive input power 114 (e.g., electrical energy) from the host device 201, for instance, when the apparatus 100 is in the power off state.

As such, for instance, based on the apparatus 100 being in the power off state and being connected to a host device 201, the display system 104 may execute the instructions 120 to receive input power 110 through the input power connector 112 to drive the display system 104. The display system 104 may also execute instructions 122 to receive display data 110 through the display port connector 108. The display system 104 may further execute instructions 124 to display the display data while bypassing the processor 102. That is, the display system 104 may display the display data received from the host device 201 without receiving instructions or other input from the processor 102 to display the received display data. In some examples, the host device 201 may send the input display data 110 to the apparatus 100 such that the apparatus 100 may operate as an extended, mirrored, or external display of the host device 201 when the apparatus 100 is in a power off state.

According to examples, and as shown in FIG. 2, the display system 104 may include a scalar board 210 that may decode the received input display data 110 into a format suitable for the input display data 110 to be displayed, may perform image processing on the input display data 110, may control the backlight of a display panel, and/or the like. The display system 104 may also include a panel integrated circuit 212 to which the scalar board 210 may output the decoded and/or image processed display data 110. The panel integrated circuit 212 may, for instance, display the received display data.

According to examples, the apparatus 200, which may include all of the features of the apparatus 100, may include a display system multiplexer 220 that may be connected to the display system 104. The display system multiplexer 220 may, when the apparatus 200 is in the power off state, receive the input display data 110 from the display port connector 108 and may output the received display data 110 to the display system 104. Particularly, for instance, the display system multiplexer 220 may direct the input display data 110 to the scalar board 210 of the display system 104 when the apparatus 100 is in the power off state, as denoted by the arrow 222, However, the display system multiplexer 220 may not output display data 110 received from the display port connector 108 when the apparatus 200 is in the power on state. Instead, when the apparatus 200 is in the power on state, the display system multiplexer 220 may output display data received from the processor 102.

According to examples, the apparatus 200 may also include an embedded controller 230 and the multifunction display port 106 may include a hot plug detect connector 232, When in the power off state, the embedded controller 230 may communicate a hot plug signal, which is denoted by the arrow 234, to the hot plug detect connector 232, That is, for instance, when the apparatus 200 is in the power off state and the host device 201 is connected to the multifunction display port 106, the embedded controller 230 may output the hot plug signal 234 through the hot plug detect connector 232 to the host device 201. The host device 201 may receive the hot plug signal 234 and may initiate delivery of the input display data 110 to the apparatus 200 based on receipt of the hot plug signal 234. The apparatus 202 may further include an embedded controller multiplexer 236 that may receive the hot plug signal 234 from the embedded controller 230 and may deliver the hot plug signal 234 to the hot plug detect connector 232.

The apparatus 200 may further include an internal power supply 240, which may be an internal battery and/or a power supply that may receive power from an external power source (not shown). The external power source may be an AC power source or a DC power source, such as a wall outlet, an external battery, or the like. When the apparatus 200 is in the power off state, the internal power supply 240 may supply electrical energy to the embedded controller 230 without supplying power to the processor 102, the display system 104, the display system multiplexer 220, etc. In some examples, when in the power off state, the internal power supply 240 may supply electrical energy to the embedded controller 230 without supplying electrical energy to any other component in the apparatus 200. As such, for instance, when in the power off state, the display system 104 may receive electrical energy from the host device 201 and may bypass the internal power supply 240.

According to examples, the apparatus 202 may also include a touch module 250 and the multifunction display port 106 may include a data input/output connector 252. The touch module 250 may receive input electrical energy from the host device 201 via the input power connector 112 and may receive input signals, which are represented by the arrow 254, from the host device 201 through the data input/output connector 252 when the apparatus 200 is in the power off state and the host device 201 is connected to the multifunction display port 106. The input signals may include, for instance, signals that may enable a display of the apparatus 200 to operate as an input device for the host device 201. That is, the touch module 250 may cause, for instance, a keyboard and/or a touchpad to be displayed on a display of the display system 104. In addition, inputs to the touch module 250 may be communicated to the host device 201 such that the host device 201 may process the inputs. By way of example in which the touch module 250 causes a keyboard to be displayed on the apparatus 200, an input of the letter "a" may be detected, in which the letter "a" may be displayed on a display of the host device 201 and/or may cause a function to performed.

The apparatus 200 may further include a touch module multiplexer 256 that may receive the input signal 254 from the data input/output connector 252 and may deliver the input signal 254 to the touch module 250.

Figure 3:
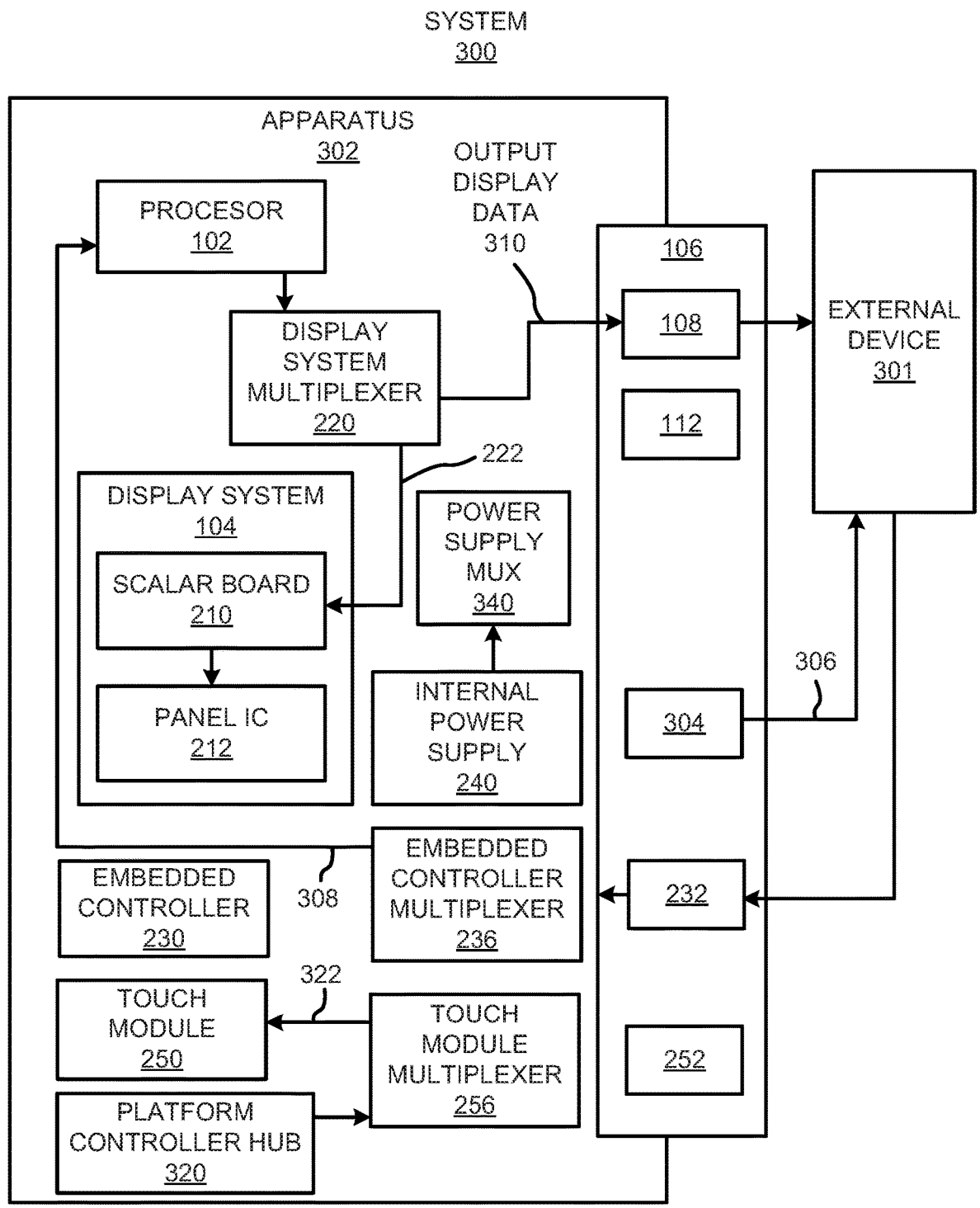
FIG. 3 shows a block diagram of an example system that may include an external device and an example apparatus, in which the example apparatus may be in a power on state.

Turning now to FIG. 3, there is shown a block diagram of an example system 300 that may include an external device 301 and an example apparatus 302, in which the example apparatus 302 may be in a power on state. It should be understood that the example system 300 depicted in FIG. 3 may include additional components and that some of the components described herein may be removed and/or modified without departing from the scopes of the example system 300 disclosed herein.

The apparatus 302 depicted in FIG. 3 may be similar to the apparatuses 100 and 202 and thus, the following descriptions of the apparatuses 100 and 202 may be construed as also corresponding to the apparatuses 100 and 202. In addition, therefore, the apparatus 302 may include many common components as the apparatuses 100 and 202. Descriptions of the common components are not repeated with respect to the apparatus 302, and instead, the descriptions of the common components provided with respect to the apparatuses 100 and 202 are relied upon to describe these components with respect to the apparatus 302.

As shown in FIG. 3, the multifunction display port 106 may include an output power connector 304. According to examples, when the apparatus 302 is in the electrical energy on state and the external device 301 is connected to the multifunction display port 106, electrical energy, as denoted by the arrow 306, may be outputted from the internal power supply 240 to the external device 301. The external device 301 may be an electronic device having a display, such as, a monitor, a laptop computer, a television, and/or the like. In some examples, the external device 301 may be powered through receipt of the electrical energy 306 from the internal power supply 240.

In addition, the external device 301 may have an embedded controller thatmay send a hot plug signal, as denoted by the arrow 308, to the apparatus 302 in response to the external device 301 being connected to the multifunction display port 106. That is, the external device 301 may send the hot plug signal 308 through the hot plug detect connector 232, which may deliver the hot plug signal 308 to the embedded controller multiplexer 236. The embedded controller multiplexer 236 may also deliver the hot plug signal 308 to the processor 102. In one regard, the embedded controller multiplexer 236 may direct the hot plug signal 308 from the external device 301 to the processor 102 when the apparatus 302 is in the power on state and may direct the hot plug signal 234 to the external device 301 when the apparatus 302 is in the power off state.

In response to receipt of the hot plug signal from the external device 301, the apparatus 302 may cause output display data, as denoted by the arrow 310, to be directed to the display port connector 108. In addition, the output display data 310 may be directed to the external device 301, which may include display components to display the output display data 310. As shown in FIG. 3, the processor 102 may direct the output display data 310 to the display system multiplexer 220, which may direct the output display data 310 to the display port connector 108. The display system multiplexer 220 may also or alternatively direct display data, as denoted by the arrow 222, received from the processor 102 to the display system 104. In one regard, the display system multiplexer 220 may direct the output display data 310 from the processor 102 to be displayed by the display system 104 when the apparatus 302 is in the power on state and may direct the input display data 110 to be displayed by the display system 104 when the apparatus 302 is in the power off state.

In some examples, the apparatus 302 may include a platform controller hub 320 that may control certain data paths and may support functions used in conjunction with the processor 102. For instance, the platform controller hub 320 may control a system clock, a display interface, etc. As shown in FIG. 3, the platform controller hub 320 may control the touch module 250 when the apparatus 302 is in the power on state. That is, the platform controller hub 320 may output signals, as denoted by the arrow 322, to the touch module 250, In addition, the platform controller hub 320 may direct the output signals 320 to the touch module multiplexer 256, which may direct the output signals 322 to the touch module 250. In one regard, the touch module multiplexer 256 may direct the output signals 322 from the platform controller hub 320 to the touch module 250 when the apparatus 302 is in the power on state and may direct the input signals 254 received from the host device 201 to the touch module 250 when the apparatus 302 is in the power off state.

According to examples, the apparatus 302 may further include a power supply multiplexer 340 that may direct input power 114 from the host device 201 to the touch module 250 when the apparatus 302 is in the power off state. In addition, the power supply multiplexer 340 may direct power from the internal power supply 240 to the touch module 250 when the apparatus 302 is in the power on state.

Figure 4:
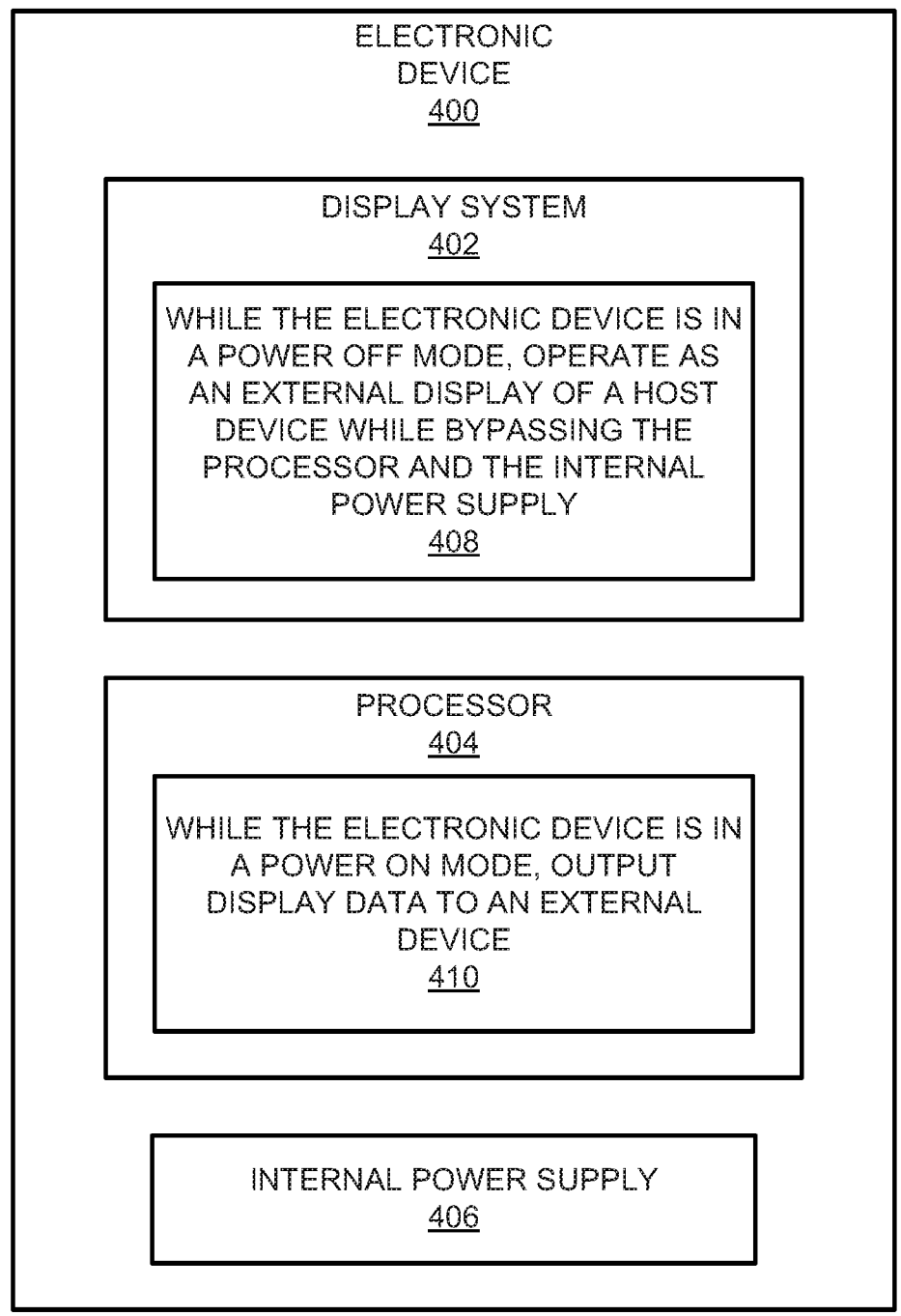
FIG. 4 shows an example electronic device that may include a display system that may operate as an external display of a host device while the electronic device is in a power off mode.

Turning now to FIG. 4, there is shown a block diagram of an example electronic device 400 that may include a display system 402 that may operate as an external display of a host device while the electronic device 400 is in a power off mode. It should be understood that the example electronic device 400 depicted in FIG. 4 may include additional components and that some of the components described herein may be removed and/or modified without departing from the scope of the electronic device 400 disclosed herein.

As shown, the electronic device 400 may include a display system 402, a processor 404, and an internal power supply 406. The display system 402 may be similar or equivalent to the display system 104 discussed above with respect to FIGS. 1-3. In addition, the processor 404 may be similar to the processor 102 discussed above with respect to FIGS. 1-3. Moreover, the internal power supply 406 may be equivalent to the internal power supply 240 discussed above with respect to FIGS. 2 and 3.

According to examples, while the electronic device 400 is in a power off mode, the display system 402 may cause the display system 402 to operate as an external display of a host device 201 while bypassing the processor 102 and the internal power supply 240 (instructions 408). The display system 402 may operate as an external display in any of the manners discussed above. For instance, the display system 402 may receive the input display data 110 via the display system multiplexer 220 from the display port connector 108 as discussed above.

According to examples, while the electronic device 400 is in a power on mode, the processor 404 may output display data to an external device 301. The processor 404 may output the display data via a display system multiplexer 220 to the display port connector 108 as discussed above.

Although not shown, the electronic device 400 may include a multifunction display port 106 having a display port connector 108 and an input power connector 112. The electronic device 400 may also include a display system multiplexer 220, an embedded controller 230, an embedded controller multiplexer 236, a platform controller hub 320, a touch module 250, a touch module multiplexer 256, etc.

Figure 5:
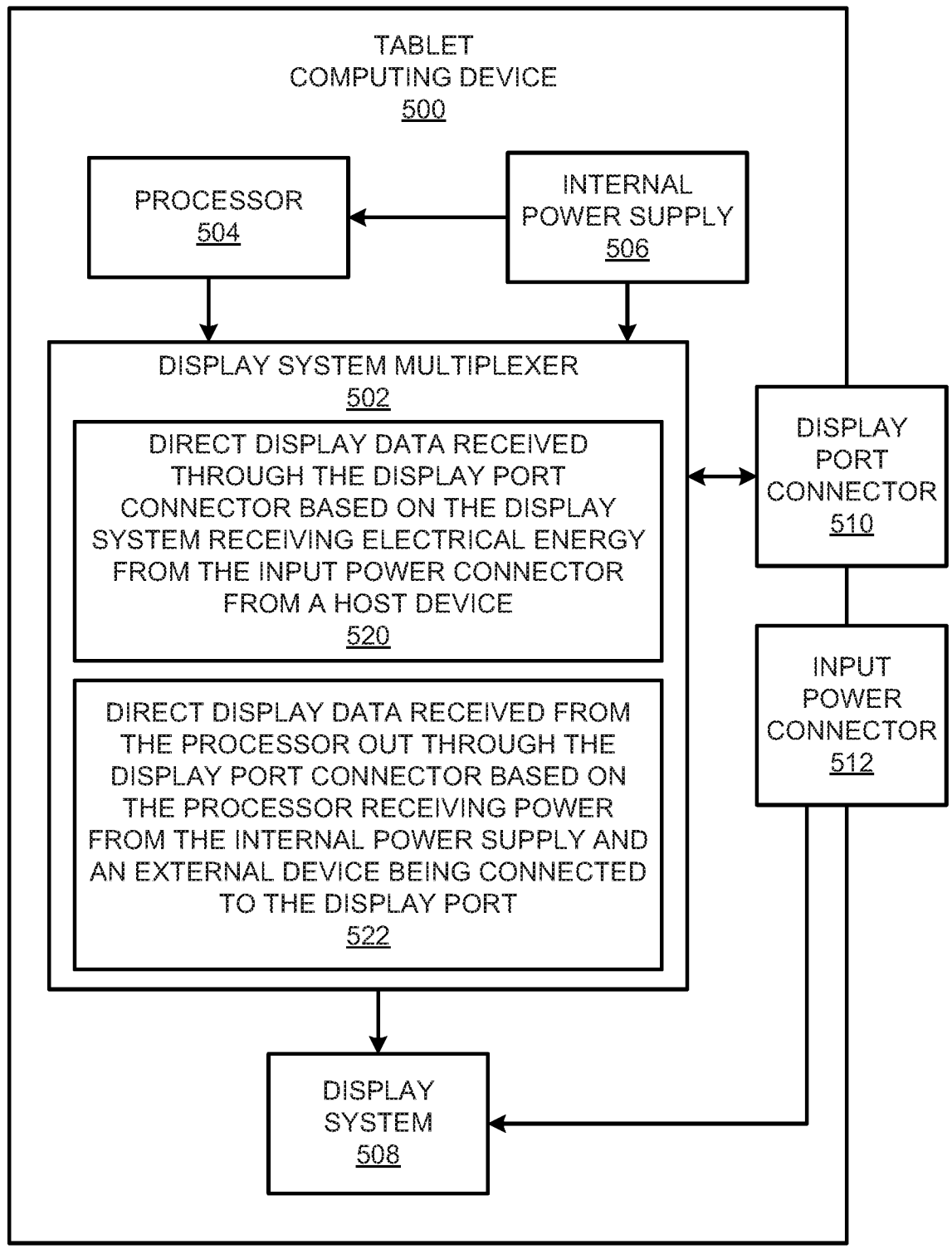
FIG. 5 shows a block diagram of an example tablet computing device that may include a display system multiplexer, in which the display system multiplexer may direct display data based on a source of electrical energy.

With reference now to FIG. 5, there is shown a block diagram of an example tablet computing device 500 that may include a display system multiplexer 502, in which the display system multiplexer may direct display data based on a source of electrical energy. It should be understood that the example tablet computing device 500 depicted in FIG. 5 may include additional components and that some of the components described herein may be removed and/or modified without departing from the scope of the tablet computing device 500 disclosed herein.

As shown, the tablet computing device 500 may include a display system multiplexer 502, a processor 504, an internal power supply 506, a display system 508, a display port connector 510, and an input power connector 512. The components of the tablet computing device 500 may be similar or equivalent to common components of the apparatuses 100, 202, 302 discussed above.

According to examples, the display system multiplexer 502 may direct display data 110 received through the display port connector 510 based on the display system 508 receiving power from the input power connector from a host device 201 (instructions 520). As discussed herein, the display system 508 may receive electrical energy from the host device 201 when the tablet computing device 500 is in the power off mode. In addition, when the tablet computing device 500 is in the power off mode, the processor 504 may not deliver display data to the display system 508 and thus, the tablet computing device 500 may operate as an external display, a mirrored display, a touch-based input device, etc.

According to examples, the display system multiplexer 502 may direct display data received from the processor 504 out through the display port connector 510 based on the processor 504 receiving electrical energy from the internal power source 506 and an external device 301 being connected to the display port connector 510. The processor 502 may receive electrical energy from the internal power source 506 when the tablet computing device 500 is in the power on mode as discussed herein.

Although not shown, the tablet computing device 500 may include a multifunction display port 106 having the display port connector 510 and the input power connector 512. The tablet computing device 500 may also include a display system multiplexer 220, an embedded controller 230, an embedded controller multiplexer 236, a platform controller hub 320, a touch module 250, a touch module multiplexer 256, etc.

Although described specifically throughout the entirety of the instant disclosure, representative examples of the present disclosure have utility over a wide range of applications, and the above discussion is not intended and should not be construed to be limiting but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
    a processor;
    an internal power supply;
    a display system;
    a display port; and
    a display multiplexer,
    wherein, when the apparatus is in a power oft state that causes the display system and the display multiplexer to be powered off and when the display port is connected to receive display data and power from an external host device, the display multiplexer is to receive the power from the external host device through the display port and send the display data received from the external host device through the display port to the display system while bypassing the processor, and the display system is to receive the power from the external host device and operate as an external display to output the display data received from the external host device, and
    wherein, when the apparatus is in a power on state that causes the display system and the display multiplexer to receive power from the internal power supply the display multiplexer is to send other display data received from the processor to the display system and is not to send the display data from the external host device to the display system, and the display system is to output the other display data received from the processor.

2. The apparatus of claim 1, wherein the display port includes:
    a display port connector to receive the display data from the external host device, and
    an input power connector to receive the power from the external host device.

3. The apparatus of claim 1, wherein the display port includes an output power connector, and wherein the power from the internal power supply of the apparatus is to be outputted to the external host device through the output power connector when the apparatus is in the power on state and the external host device is connected to the apparatus via the display port.

4. The apparatus of claim 1, further comprising:
an embedded controller to receive the power from the internal power supply when the apparatus is in the power off state,
wherein the display port includes a hot plug detect connector,
wherein the embedded controller is to communicate a hot plug signal to the external host device through the hot plug detect connector in response to the apparatus being in the power off state and the external host device being connected to the display port, and
wherein the external host device initiates delivery of the display data to the display port of the apparatus in response to receipt of the hot plug signal.

5. The apparatus of claim 4, further comprising:
an embedded controller multiplexer to:
 direct the hot plug signal from the embedded controller to the external host device through the hot plug detect connector while the apparatus is in the power off state; and
 direct another hot plug signal from the external host device connected to the apparatus via the hot plug detect connector to the processor while the apparatus is in the power on state and the external host device is connected to the display port.

6. The apparatus of claim 1, further comprising:
a touch module,
wherein the display port includes a data input/output connector, and
wherein the touch module is to receive the power from the external host device via the display port and to receive input signals from the external host device through the data input/output connector based on the apparatus being in the power off state and the external host device being connected to the display port.

7. The apparatus of claim 6, further comprising:
a power supply multiplexer to direct the power from the external host device to the touch module based on the apparatus being in the power off state and to direct the power from the internal power supply to the touch module based on the apparatus being in the power on state.

8. The apparatus of claim 1,
wherein the display system includes a panel integrated circuit and a scalar board, and
wherein the display multiplexer is to direct the display data received from the external host device through the display port to the scalar board based on the apparatus being in the power off state and to direct the display data received from the processor to the scalar board based on the apparatus being in the power on state.

9. An electronic device comprising:
a display system;
a processor;
an internal power supply;
a display port; and
a display multiplexer,
wherein, when the electronic device is in a power off mode that causes the display system and the display multiplexer to be powered off and when the display port receives display data and power from an external host device, the display multiplexer is to receive the power from the external host device through the display port and send the display data received from the external host device through the display port to the display system while bypassing the processor, and the display system is to operate as an external display to output the display data received from the external host device, and
wherein, when the electronic device is in a power on mode that causes the display system and the display multiplexer to receive power from the internal power supply, the display multiplexer is to send other display data received from the processor to the display system and is not to send the display data from the external host device to the display system, and the display system is to output the other display data received from the processor.

10. The electronic device of claim 9, wherein the display port comprises:
a display port connector to receive the display data from the external host device, and
an input power connector to receive the power from the external host device.

11. The electronic device of claim 9, wherein the display port includes an output power connector, and wherein the power from the internal power supply of the electronic device is to be outputted to the external host device through the output power connector when the electronic device is in the power on state and the external host device is connected to the display port of the electronic device.

12. The electronic device of claim 9, further comprising:
an embedded controller; and
an embedded controller multiplexer,
wherein the display port includes a hot plug detect connector, and
wherein the embedded controller multiplexer is to:
 communicate a hot plug signal to the external host device through the hot plug detect connector when the electronic device is in the power off mode and the external host device initiates delivery of the display data and the power to the electronic device in response to receipt of the hot plug signal; and
 communicate another hot plug signal received from the external host device to the processor when the electronic device is in the power on mode.

13. The electronic device of claim 9, further comprising:
a platform controller hub;
a touch module; and
a touch module multiplexer,
wherein the display port includes a data input/output connector, and
wherein the touch module multiplexer is to:
 direct input signals received from the data input/output connector to the touch module when the electronic device is in the power off mode; and
direct input signals received from the platform controller hub to the touch module when the electronic device is in the power on mode.

14. A tablet computing device comprising:
a processor;
an internal power supply;
a display system;
a display multiplexer; and
a display port including: a display port connector and an input power connector,
wherein, when the tablet computing device is in a power off state that causes the display system and the display multiplexer to be powered off and when the display port receives power and display data from an external host device, the display multiplexer is to receive the power from the external host device through the display port and direct the display data received from the external host device through the display port to the display system while bypassing the processor, and the display system is to receive the power from the external host device and output the display data received from the external host device, and wherein, when the tablet computing device is in a power on state that causes the display system and the display multiplexer to receive power from the internal power supply, the display multiplexer is to direct other display data received from the processor to the display system, and the display system is to output the other display data received from the processor.

15. The tablet computing device of claim 14, further comprising:
   a platform controller hub;
   an input/output data connector;
   a touch module; and
   a touch module multiplexer to:
      direct data received from the external host device through the input/output data connector to the touch module when the tablet computing device is in the power off state; and
   direct data received from the platform controller hub to the touch module when the tablet computing device is in the power on state.

* * * * *